(12) United States Patent
Nomura et al.

(10) Patent No.: US 8,154,791 B2
(45) Date of Patent: Apr. 10, 2012

(54) LIGHT CONTROL FILM

(75) Inventors: Satoyuki Nomura, Tsukuba (JP); Yoshii Morishita, Tsukuba (JP); Tooru Tanaka, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 78 days.

(21) Appl. No.: 12/864,062

(22) PCT Filed: Jan. 22, 2009

(86) PCT No.: PCT/JP2009/050977
§ 371 (c)(1),
(2), (4) Date: Jul. 22, 2010

(87) PCT Pub. No.: WO2009/093657
PCT Pub. Date: Jul. 30, 2009

(65) Prior Publication Data
US 2010/0309544 A1    Dec. 9, 2010

(30) Foreign Application Priority Data

Jan. 23, 2008    (JP) ................................ P2008-012932

(51) Int. Cl.
*G02B 26/00* (2006.01)
*G09G 3/34* (2006.01)

(52) U.S. Cl. ........................................ 359/296; 345/107

(58) Field of Classification Search .................. 359/296; 345/107; 430/32; 204/600
See application file for complete search history.

(56) References Cited

U.S. PATENT DOCUMENTS

| 1,955,923 A | 8/1932 | Land |
| 1,963,496 A | 1/1933 | Land |
| 2,041,138 A | 5/1936 | Land |
| 2,306,108 A | 12/1942 | Land |
| 2,375,963 A | 5/1945 | Thomas |
| 3,756,700 A | 9/1973 | Saxe |
| 3,912,365 A | 10/1975 | Lowell |
| 4,078,856 A | 3/1978 | Thompson et al. |
| 4,247,175 A | 1/1981 | Saxe |
| 4,270,841 A | 6/1981 | Saxe |

(Continued)

FOREIGN PATENT DOCUMENTS

| GB | 433455 | 1/1933 |
| JP | 04-009822 | 1/1992 |
| JP | 04-335326 | 11/1992 |

(Continued)

OTHER PUBLICATIONS

Translation of the preliminary Report on Patentability dated Sep. 10, 2010, for International (PCT) Application No. PCT/JP2009/050977.

*Primary Examiner* — William Choi
(74) *Attorney, Agent, or Firm* — Antonelli, Terry, Stout & Kraus, LLP.

(57) ABSTRACT

Disclosed is a light control film comprising:
two transparent electroconductive resin substrates; and
a light control layer sandwiched between the two transparent electroconductive resin substrates, the light control layer containing:
a resin matrix; and
a light control suspension dispersed in the resin matrix,
wherein the light control film has a primer layer on the light control layer side of at least one of the transparent electroconductive resin substrates, and the primer layer is formed by using a phosphoric ester having in the molecule thereof one or more polymerizable groups. By virtue of the above constitution, the light control film has an improved adhesion between a film matrix and a substrate, and has a stable light control function.

11 Claims, 2 Drawing Sheets

| U.S. PATENT DOCUMENTS | | | |
|---|---|---|---|
| 4,273,422 A | 6/1981 | Saxe | |
| 4,407,565 A | 10/1983 | Saxe | |
| 4,422,963 A | 12/1983 | Thompson et al. | |
| 6,987,602 B2 * | 1/2006 | Saxe | 359/296 |
| 2003/0107797 A1 | 6/2003 | Saxe | |

| FOREIGN PATENT DOCUMENTS | | |
|---|---|---|
| JP | 2001-004986 | 1/2001 |
| JP | 2004-264693 | 9/2004 |
| JP | 2006-512613 | 4/2006 |
| WO | WO 00/75717 A1 | 12/2000 |

* cited by examiner

LIGHT CONTROL FILM

FIELD OF THE INVENTION

The present invention relates to a light control film having a light control function.

BACKGROUND OF THE INVENTION

The light control glass containing a light control suspension is a glass invented unprecedentedly by Edwin Land (U.S. Pat. Nos. 1,955,923 and 1,963,496 specifications), and the form thereof has a structure wherein a light control suspension in a liquid state is injected into a narrow gap between two transparent electroconductive substrates. According to the invention by Edwin Land, in the liquid light control suspension injected into the gap between the two transparent electroconductive substrates, most of incident light is reflected, scattered or absorbed on or into light control particles dispersed in the suspension by Brownian motion of the light control particles when no electric field is applied to the suspension. Thus, only a very slight portion thereof is transmitted therethrough.

In other words, the degree of the transmission, the reflection, the scattering or the absorption is decided in accordance with the shape, the nature and the concentration of the light control particles dispersed in the light control suspension, and also in accordance with the amount of light energy radiated thereto. When an electric field is applied to a light control window made of a light control glass having the above-mentioned structure, an electric field is formed in the light control suspension through the transparent electroconductive substrates so that the light control particles exhibiting a light control function are polarized to be arranged in parallel to the electric field. As a result, light is transmitted between the light control particles. Finally, the light control glass turns transparent.

However, such an early light control device has not been easily put into practical use because of the aggregation of light control particles in the light control suspension, the sedimentation by their own weight, a change in the color tone by heat, a change in the optical density, a deterioration caused by the radiation of ultraviolet rays, difficulty in a maintenance of the gap between the substrates and in the injection of the light control suspension into the gap, and the like.

The specifications of U.S. Pat. Nos. 3,756,700, 4,247,175, 4,273,422, 4,407,565 and 4,422,963 issued by Robert. L. Saxe, the specification of U.S. Pat. No. 3,912,365 issued by F. C. Lowell or that of U.S. Pat. No. 4,078,856 issued by R. I. Thompson discloses a light control window using a light control glass complementing initial problems of a light control window, that is, the aggregation and the sedimentation of light control particles, a change in the optical density, and others.

According to these patents and so on, by effect of a liquid-state light control suspension composed of a needle-form light control crystal particles, a suspending agent for dispersing the crystal particles, a dispersion adjustor, a stabilizer and others, the density of the light control particles and that of the suspending agent are made substantially equal to each other to prevent the sedimentation of the light control particles. In addition thereto, the addition of the dispersion adjustor makes the dispersibility of the light control particles high, thereby preventing the aggregation of the light control particles to solve the initial problems.

However, these light control glasses each have a structure wherein a liquid light control suspension is enclosed in a gap between two transparent electroconductive substrates, as seen in conventional light control glasses. Thus, when a large-sized product is produced, it is difficult to enclose a suspension uniformly into the gap between two transparent electroconductive substrates, and a swelling phenomenon is easily caused at the lower region of the product by a hydraulic pressure difference between the upper and lower regions of the product. Moreover, the optical density is varied by a change in the interval between the substrates, which is caused by external environments, for example, the pressure of wind, so that the color tone is easily turned heterogeneous. Furthermore, a surrounding sealing member for storing the liquid between the transparent electroconductive substrates is broken so that the light control material leaks or other problems are caused. Additionally, the response time becomes uneven by a deterioration caused by ultraviolet rays, or a voltage drop between the periphery of the transparent electroconductive substrates and the center.

DISCLOSURE OF THE INVENTION

As the method for overcoming the above mentioned problems, suggested is a method comprising the steps of producing a film by use of a phase separation method of mixing a liquid light control suspension with a solution of a curable polymeric resin, and then performing a phase separation method based on polymerization, a phase separation method based on solvent volatilization, a phase separation method dependent on temperature, or the like. However, the polymeric resin, which is cured to be turned into a film matrix, is not molecule-designed, considering the adhesiveness onto the transparent electroconductive substrates. Thus, the adhesiveness between the film matrix and the substrates such as a PET film having a surface on which an electroconductive thin film made of ITO or the like is formed, is poor, and there remains a problem that the substrates are very easily peeled.

An object of the invention is to provide a light control film wherein the adhesiveness between a film matrix and substrates is improved so that a stable light control function is exhibited.

The inventors have made eager investigations so as to find out that the problems can be solved by laying a specific primer layer onto a light control layer side surface of at least one transparent electroconductive substrate.

That is, the invention relates to a light control film comprising:
  two transparent electroconductive resin substrates; and
  a light control layer sandwiched between the two transparent electroconductive resin substrates, the light control layer containing:
    a resin matrix; and
    a light control suspension dispersed in the resin matrix,
  wherein the light control film has a primer layer on the light control layer side of at least one of the transparent electroconductive resin substrates, and the primer layer is formed by using a phosphoric ester having in the molecule thereof one or more polymerizable groups.

The phosphoric ester having in the molecule thereof one or more polymerizable groups is preferably a phosphoric monoester or a phosphoric diester. The polymerizable group is preferably a (meth)acryloyloxy group. The primer layer may be formed by using a solution containing the phosphoric ester having in the molecule thereof one or more polymerizable groups. The concentration of the phosphoric ester having in the molecule thereof one or more polymerizable groups in the solution is preferably within the range from 0.05 to 20% by mass.

It is preferred that the primer layer is formed, further by using a polymerizable monomer or oligomer in combination. It is also preferred that the polymerizable monomer or oligomer is an acrylate, and it is more preferred that the polymerizable monomer or oligomer is cured by heat or light.

The invention also relates to a light control film comprising:
two transparent electroconductive resin substrates; and
a light control layer sandwiched between the two transparent electroconductive resin substrates, the light control layer containing:
a resin matrix; and
a light control suspension dispersed in the resin matrix, the light control film has a primer layer on the light control layer side of at least one of the transparent electroconductive resin substrates, and the primer layer is formed using a silane coupling agent having an amino group.

The primer layer may be formed by using a solution containing the silane coupling agent having an amino group, and the concentration of the silane coupling agent having an amino group in the solution is preferably within the range from 1 to 15% by mass.

In the invention, the film thickness of the primer layer is preferably 1 µm or less.

The light control film of the invention is high in the adhesiveness between the light control layer and the transparent electroconductive resin substrates to make it possible to exhibit a stable light control function.

The disclosure of the invention is related to the subject matter described in Japanese Patent Application No. 2008-012932 filed on Jan. 23, 2008, and the disclosure contents thereof are incorporated herein by reference.

BEST MODE FOR CARRYING OUT THE INVENTION

Figure 1:
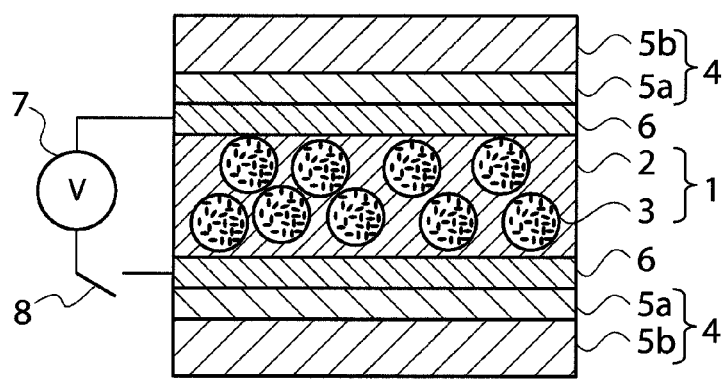
FIG. 1 The figure is a schematic view of a sectional structure of an embodiment of a light control film of the present invention.

The light control film of the present invention is a light control film wherein a light control layer containing: a resin matrix; and a light control suspension dispersed in the resin matrix, is sandwiched between two transparent electroconductive resin substrates, and a specific primer layer is laid on a surface of at least one of the transparent electroconductive resin substrates, the surface contacting the light control layer.

In general, the light control layer can be formed by use of a light control material. The light control material contains: a polymeric medium curable by irradiation with an energy ray, as the resin matrix; and
a light control suspension wherein light control particles are dispersed, in a fluidizable state, in a dispersing medium. The dispersing medium in the light control suspension is preferably a medium that can undergo a phase separation from the polymeric medium and a cured product thereof. The light control film of the invention is obtained by using the light control material to sandwich the light control layer, wherein the light control suspension is dispersed in the resin matrix made of the polymeric medium, between two transparent electroconductive resin substrates each having a light-control-layer-contacting surface subjected to primer treatment, between two transparent electroconductive resin substrates only one of which has a light-control-layer-contacting surface subjected to primer treatment, or the like.

In other words, in the light control layer in the light control film of the invention, the liquid light control suspension is dispersed, in the form of fine droplets, inside the resin matrix in a solid state, wherein the polymeric medium is cured. The light control particles contained in the light control suspension are preferably in the form of rods or needles.

When an electric field is applied to the light control film, the light control particles, which are suspended and dispersed in the droplets of the light control suspension dispersed in the resin matrix and each have an electrical dipolar moment, are arranged in parallel to the electric field, whereby the droplets are turned into a state that the droplets are transparent to incident light. As a result, the incident light is transmitted therethrough in the state that the light is hardly scattered in accordance with the angle for viewing or that a fall in transparency is hardly caused. In the invention, the light control layer is laid on a specific primer layer so as to prepare a film, thereby solving a problem of any conventional light control film, that is, a problem that the adhesiveness between its light control layer and its transparent electroconductive resin substrates is weak so that the light control layer is peeled from the transparent electroconductive resin substrates in the production step of the film, in a processing step after the production, or some other step.

Hereinafter, the structure of each of the layers, and the light control film will be described.

<Primer Layer>

First, the primer layer is described.

(1) Phosphoric Ester Having in the Molecule Thereof One or More Polymerizable Groups In the invention, one of materials for forming the primer layer is a phosphoric ester having in the molecule thereof one or more polymerizable groups. The material is more preferably a phosphoric monoester or phosphoric diester having in the molecule thereof one or more polymerizable groups. The phosphoric ester having in the molecule thereof one or more polymerizable groups usually has the polymerizable group(s) in one or more ester moieties thereof, and preferably has the one polymerizable group in one ester moiety thereof. The number of the polymerizable groups in the molecule is preferably one or two. The phosphoric ester preferably has in the molecule thereof a (poly)alkylene oxide structure such as (poly)ethylene oxide, (poly)propylene oxide, or the like.

The polymerizable group is preferably a group polymerizable by heat, irradiation with an energy ray, or some other method or means, and is, for example, a group having an ethylenically unsaturated double bond, such as a (meth)acryloyloxy group.

More specifically, the material for forming the primer layer is preferably a phosphoric monoester or phosphoric diester having in the molecule thereof a (meth)acryloyloxy group.

An example of the phosphoric monoester or phosphoric diester having a (meth)acryloyloxy group is a compound represented by the following formula (1) or (2):

[formula 1]

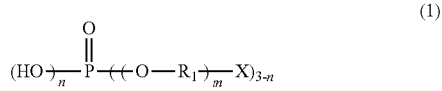

wherein each $R_1$ independently represents a linear or branched alkylene group having 1 to 4 carbon atoms, m is an integer of 1 or more, n is 1 or 2, and each X is independently selected from the following:

[formula 2]

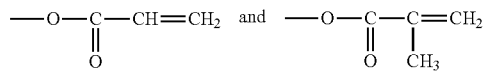

m is preferably from 1 to 10, more preferably from 1 to 6.

Specific examples of the linear or branched alkylene group having 1 to 4 carbon atoms for $R_1$ in the formula (1) include a methylene group, an ethylene group, an n-propylene group, and a butylene group as examples of the linear alkylene group having 1 to 4 carbon atoms; and an i-propylene group as an example of the branched alkylene group having 1 to 4 carbon atoms.

[formula 3]

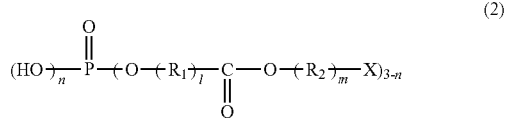

wherein each $R_1$ and each $R_2$ independently represents a linear or branched alkylene group having 1 to 4 carbon atoms, l and m are each independently an integer of 1 or more, n is 1 or 2, and each X is independently selected from the following:

[formula 4]

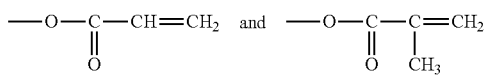

l is preferably from 1 to 10, more preferably from 1 to 5, and m is preferably from 1 to 5, more preferably from 1 to 2.

Specific examples of the linear or branched alkylene group having 1 to 4 carbon atoms for $R_1$ and $R_2$ in the formula (2) include a methylene group, an ethylene group, an n-propylene group, and a butylene group as examples of the linear alkylene group having 1 to 4 carbon atoms; and an i-propylene group as an example of the branched alkylene group having 1 to 4 carbon atoms.

Available examples of the phosphoric monoester include PHOSMER-PP, PHOSMER-PE and PHOSMER-M manufactured by Uni-Chemical Co., Ltd., and P-1M manufactured by Kyoeisha Chemical Co., Ltd. These can be represented by structure formulae illustrated below. The structure of P-1M manufactured by Kyoeisha Chemical Co., Ltd. is equivalent to that of PHOSMER-M.

[formula 5]

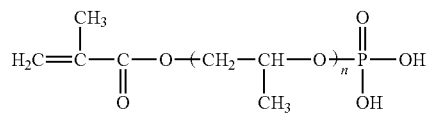

PHOSMER-PP (n = 5 to 6)

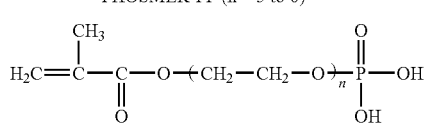

PHOSMER-PE (n = 4 to 5)

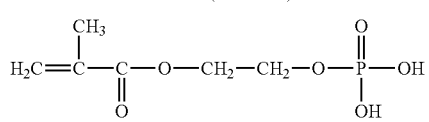

PHOSMER-M

Available examples of the phosphoric diester include PM-21 manufactured by Nippon Kayaku Co., Ltd., and P-2M manufactured by Kyoeisha Chemical Co., Ltd. These can be represented by structure formulae illustrated below.

[formula 6]

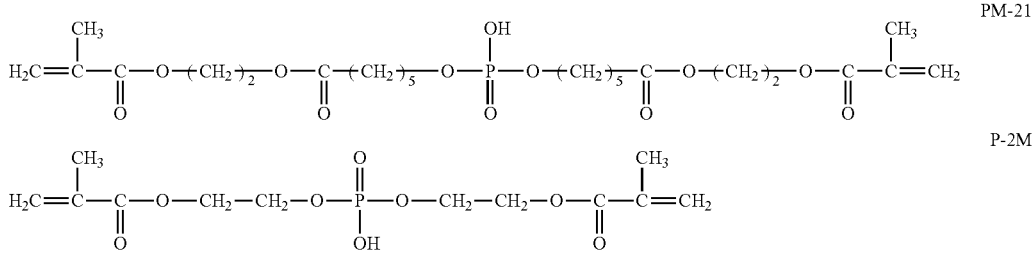

It is also preferred that a polymerizable monomer or polymerizable oligomer is used together with the phosphoric ester having in the molecule thereof one or more polymerizable groups.

Examples of the polymerizable monomer or polymerizable oligomer include acrylates such as trimethylolpropane trimethacrylate, trimethylolpropane triacrylate, ditrimethylolpropane tetramethacrylate, pentaerythritol tetraacrylate, dipentaerythritol hexaacrylate, and the like.

It is preferred that the polymerizable monomer or polymerizable oligomer is cured by heat or light. According to this manner, a strong tackiness originating from the phosphoric ester can be decreased.

It is unnecessary to cure the phosphoric ester having in the molecule thereof one or more polymerizable groups when the polymerizable monomer or polymerizable oligomer is cured.

Available examples of the polymerizable monomer or polymerizable oligomer include a UV curable hard coating agent (trade name: SANRAD RC-610R) manufactured by Sanyo Chemical Industries, Ltd. The agent SANRAD RC-610R is a mixture of compounds represented by the following formulae:

[formula 7]

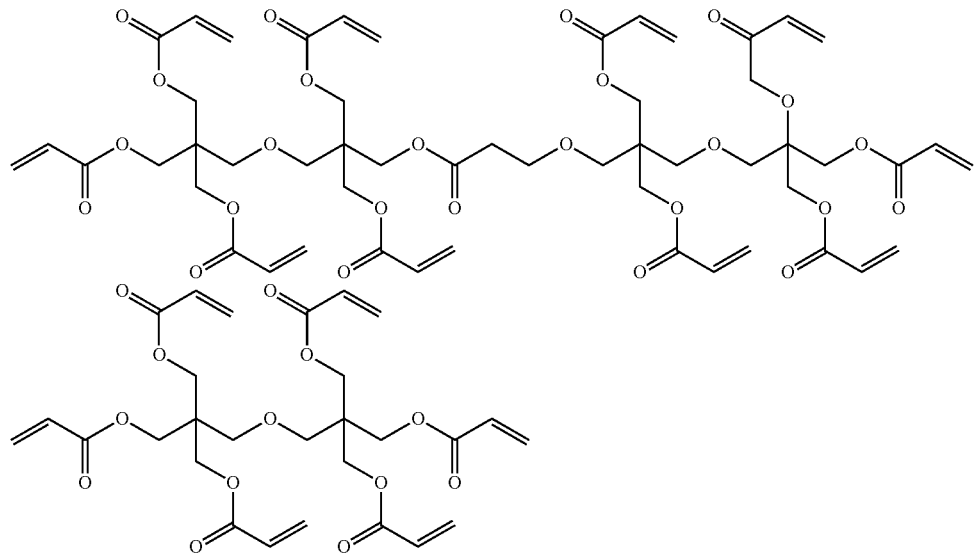

Available examples thereof other than the above include trimethylolpropane trimethacrylate (trade name: LIGHT-ESTER TMP, manufactured by Kyoeisha Chemical Co., Ltd.), trimethylolpropane triacrylate (trade name: LIGHT-ESTER TMP-A, manufactured by Kyoeisha Chemical Co., Ltd.), ditrimethylolpropane tetramethacrylate (trade name: ARONIX M-408, manufactured by Toagosei Co., Ltd.), pentaerythritol tetraacrylate (trade name: ARONIX M-450, manufactured by Toagosei Co., Ltd.), dipentaerythritol hexaacrylate (trade name: ARONIX M-405, manufactured by Toagosei Co., Ltd.).

(2) Silane Coupling Agent Having an Amino Group

In the invention, another material for forming the primer layer is a silane coupling agent having an amino group.

An examples of the silane coupling agent having an amino group is a compound represented by the following formula (3) or (4):

[formula 8]

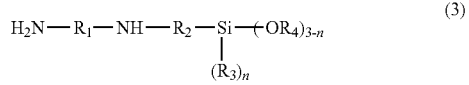

(3)

wherein $R_1$ and $R_2$, each independently represent a linear or branched alkylene group having 1 to 4 carbon atoms, each $R_3$ independently represents a linear or branched alkyl group having 1 to 4 carbon atoms, each $R_4$ independently represents a methyl group or an ethyl group, and n is an integer of 0 to 2.

Specific examples of the linear or branched alkylene group having 1 to 4 carbon atoms for $R_1$ and $R_2$ in the formula (3) include a methylene group, an ethylene group, an n-propylene group, and a butylene group as examples of the linear alkylene group having 1 to 4 carbon atoms; and an i-propylene group as an example of the branched alkylene group having 1 to 4 carbon atoms.

Specific examples of the linear or branched alkyl group having 1 to 4 carbon atoms for $R_3$ in the formula (3) include a methyl group, an ethyl group, an n-propyl group and a butyl group as examples of the linear alkyl group having 1 to 4 carbon atoms; and an i-propyl group as an example of the branched alkyl group having 1 to 4 carbon atoms.

[formula 9]

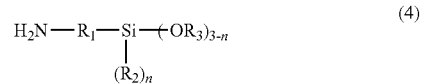

(4)

wherein $R_1$ represents a linear or branched alkylene group having 1 to 4 carbon atoms, each $R_2$ independently represents a linear or branched alkyl group having 1 to 4 carbon atoms, each $R_3$ independently represents a methyl group or an ethyl group, and n is an integer of 0 to 2.

Specific examples of the linear or branched alkylene group having 1 to 4 carbon atoms for $R_1$ in the formula (4) include a methylene group, an ethylene group, an n-propylene group, and a butylene group as examples of the linear alkylene group having 1 to 4 carbon atoms; and an i-propylene group as an example of the branched alkylene group having 1 to 4 carbon atoms.

Specific examples of the linear or branched alkyl group having 1 to 4 carbon atoms for $R_2$ in the formula (4) include a methyl group, an ethyl group, an n-propyl group and a butyl group as examples of the linear alkyl group having 1 to 4 carbon atoms; and an i-propyl group as an example of the branched alkyl group having 1 to 4 carbon atoms.

Available examples of the silane coupling agent having an amino group represented by the formula (3) or (4) include KBM-602, 603 and 903, and KBE-903 manufactured by Shin-Etsu Silicone Co., Ltd. Examples of the silane coupling agent having an amino group other than the above include KBM-573. The structures thereof are as illustrated below.

[formula 10]

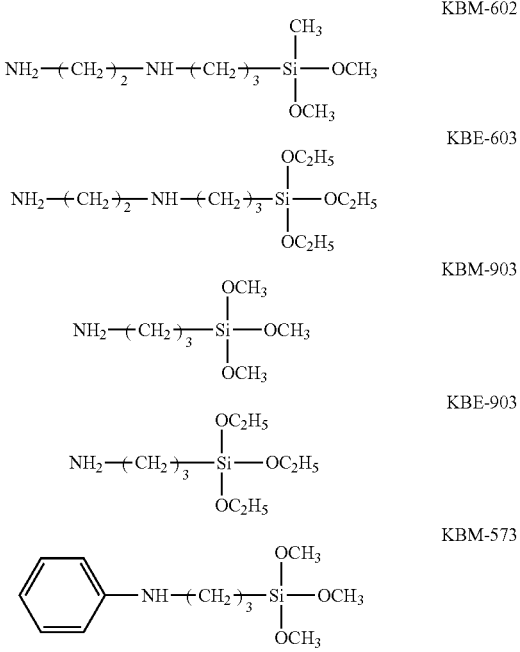

In the invention, the film thickness of the primer layer can be measured by reflectance spectrometry of ultraviolet rays or visible rays, X-ray reflectance measurement, ellipsometry, or the like. The film thickness of the primer layer is preferably 1 µm or less, more preferably from 1 nm to 1 µm. The film thickness is preferably from 1 to 800 nm, more preferably from 1 to 500 nm, even more preferably from 1 to 100 nm.

If the film thickness is less than 1 µm, a sufficient bonding strength tends to be unable to be expressed. On the other hand, if the film thickness is more than 1 µm, an unevenness tends to be generated in the film thickness of the primer layer, or the handleability tends to deteriorate at the time of producing the light control film since the layer becomes strong in tackiness.

In order to form the primer layer in the invention, a solution containing the phosphoric ester having in the molecule thereof one or more polymerizable groups may be used. When the primer layer is formed, the concentration of the phosphoric ester in the solution is preferably within the range from 0.05 to 20% by mass, more preferably within the range from 0.1 to 15% by mass, even more preferably within the range from 0.3 to 10% by mass.

If the concentration is less than 0.05% by mass, a sufficient bonding strength tends to be unable to be expressed. On the other hand, if the concentration is more than 20% by mass, an unevenness tends to be generated in the film thickness of the primer layer, or the handleability tends to deteriorate at the time of producing the light control film since the layer becomes strong in tackiness.

In the case of using, for the formation of the primer layer, a polymerizable monomer or polymerizable oligomer together with the phosphoric ester having in the molecule thereof one or more polymerizable groups, the concentration of the polymerizable monomer or polymerizable oligomer in the solution when the primer layer is formed is preferably within the range from 80 and to 95% by mass of the whole of the materials of the primer layer, more preferably within the range from 90 to 95% by mass thereof, from the viewpoint of an advantageous effect of decreasing the tackiness originating from the phosphoric ester.

In order to form the primer layer in the invention, a solution containing the silane coupling agent having an amino group may be used. When the primer layer is formed, the concentration of the silane coupling agent having an amino group in the solution is preferably within the range from 1 to 15% by mass, more preferably within the range from 2 to 10% by mass, and even more preferably within the range from 3 to 5% by mass.

If the concentration is less than 1% by mass, a sufficient bonding strength tends to be unable to be expressed. On the other hand, if the concentration is more than 15% by mass, an unevenness tends to be generated in the film thickness of the primer layer, or the handleability tends to deteriorate at the time of producing the light control film since the layer becomes strong in tackiness. If the concentration is more than 15% by mass, the bonding strength further tends to decrease.

<Light Control Layer>

Next, the light control layer is described.

The light control layer in the invention comprises a light control material containing: a resin matrix; and a light control suspension dispersed in the resin matrix. The resin matrix comprises a polymeric medium, and the light control suspension is a material wherein light control particles are dispersed, in a fluidizable state, in a dispersing medium.

As the polymeric medium and the dispersing medium (dispersing medium in the light control suspension), the following are used: a polymeric medium and dispersing medium which make it possible that when the polymeric medium, its cured product and the dispersing medium are made into a film, they undergo a phase separation from one another. It is preferred to use a combination of a polymeric medium and a dispersing medium that are incompatible with each other, or are partially compatible with each other.

The polymeric medium used in the invention may be a medium which contains a resin (A) having substituents containing ethylenically unsaturated bonds, and a photopolymerization initiator (B), and which is curable by irradiation with energy rays or an energy beam, such as ultraviolet rays, visible rays, or an electron beam. The resin (A) having ethylenically unsaturated bonds is preferably a silicone resin, an acrylic resin, a polyester resin or the like from the viewpoint of the easiness of the synthesis thereof, the light control performance, the endurance, and so on. It is preferred from the viewpoint of the light control performance, the endurance and so on that the resin has, as the substituents, alkyl groups such as methyl, ethyl, propyl, isopropyl, butyl, isobutyl, tert-butyl, amyl, isoamyl, hexyl, or cyclohexyl groups, or aryl groups such as phenyl or naphthyl groups.

Specific examples of the silicone resin include resins described in Japanese Patent Publication Nos. 53-36515, 57-52371, 58-53656 and 61-17863.

The silicon resin can be synthesized, for example, by subjecting the following compound to dehydrogenating condensation reaction and dealcoholization reaction in the presence of tin 2-ethylhexane as an organic tin catalyst:

a silanol-both-terminated siloxane polymer, such as silanol-both-terminated polydimethylsiloxane, silanol-both-terminated polydiphenylsiloxane-dimethylsiloxane copolymer or silanol-both-terminated polydimethyldiphenylsiloxane, a trialkylalkoxysilane, such as trimethylethoxysilane, an ethylenically-unsaturated-bond-containing silane compound, such as (3-acryloxypropyl)methyldimethoxysilane. The form of the silicone resin is preferably a solvent-free form. In other words, when a solvent is used to synthesize the silicone resin, it is preferred to remove the solvent after the synthesis reaction.

In the charging and blending of the individual raw materials when the silicone resin is produced, the amount of the ethylenically-unsaturated-bond-containing silane compound, such as (3-acryloxypropyl)methoxysilane, is set preferably within the range of 19 to 50% by mass of the total of the starting siloxane and silane compound, more preferably within the range of 25 to 40% by mass thereof. If the amount of the ethylenically-unsaturated-bond-containing silane compound is less than 19% by mass, the concentration of the ethylenically unsaturated bonds in the finally obtained resin tends to be excessively lower than a desired concentration. If the amount is more than 50% by mass, the concentration of the ethylenically unsaturated bonds in the obtained resin tends to be excessively higher than the desired concentration.

The acrylic resin can be yielded, for example, by copolymerizing a main-chain-forming monomer, such as an alkyl (meth)acrylate, an aryl (meth)acrylate, benzyl (meth)acrylate or styrene with a functional-group-containing monomer for introducing an ethylenically unsaturated bond, such as (meth)acrylic acid, hydroxyethyl (meth)acrylate, isocyanatoethyl (meth)acrylate or glycidyl (meth)acrylate, so as to synthesize a prepolymer once; and then subjecting a monomer, such as glycidyl (meth)acrylate, isocyanatoethyl (meth)acrylate, hydroxyethyl (meth)acrylate and (meth)acrylic acid, to addition-react with the prepolymer in order to subject the monomer to react with the functional group of the prepolymer.

The above-mentioned polyester resin is not particularly limited, and may be a resin that can easily be produced by a known method.

The polystyrene-converted weight-average molecular weight of the resin (A) having ethylenically unsaturated bonds is preferably within the range from 20,000 to 100,000, more preferably within the range from 30,000 to 80,000, the molecular weight being obtained by gel permeation chromatography.

In the resin (A) having ethylenically unsaturated bonds, the concentration of the ethylenically unsaturated bonds is preferably within the range from 0.3 to 0.5 mol/kg. If this concentration is less than 0.3 mol/kg, end regions of the light control film are not easily treated so that the transparent electrodes opposed to each other are easily short-circuited so as to tend to give a poor electrical reliability. On the other hand, if the concentration is more than 0.5 mol/kg, the cured polymeric medium is easily dissolved into the dispersing medium, which constitutes droplets of the light control suspension, so that the dissolved polymeric medium tends to hinder the movement of the light control particles in the droplets so as to lower the light control performance.

In the resin having ethylenically unsaturated bonds, the concentration of the ethylenically unsaturated bonds is obtained from the hydrogen integrated-intensity ratio according to NMR. When the conversion ratio of the charged raw materials to the resin is known, the concentration is obtained by calculation also.

The photopolymerization initiator may be any one of compounds described in J. Photochem. Sci. Technol. 2,283 (1977), specific examples thereof including 2,2-dimethoxy-1,2-diphenylethane-1-one, 1-(4-(2-hydroxyethoxy)phenyl)-2-hydroxy-2-methyl-1-propane-1-one, bis(2,4,6-trimethylbenzoyl)phenylphosphine oxide, 2-hydroxy-2-methyl-1-phenylpropane-1-one, or 1-hydroxycyclohexyl phenyl ketone.

The use amount of the photopolymerization initiator (B) is preferably within the range from 0.1 to 20 parts by mass, more preferably within the range from 0.2 to 10 parts by mass relative to 100 parts by mass of the resin (A).

Besides the resin (A) having substituents having ethylenically unsaturated bonds, the following may be used together as a constituent material of the polymeric medium: an organic solvent soluble resin or a thermoplastic resin, for example, a polyacrylic acid or polymethacrylic acid having a polystyrene-converted weight-average molecular weight within the range of 1,000 to 100,000, the molecular eight being measured by gel permeation chromatography.

An additive, such as dibutyltin dilaurate or some other anti-coloring agent, may be incorporated into the polymeric medium if necessary. The polymeric medium may contain a solvent, examples of which include tetrahydrofuran, toluene, heptane, cyclohexane, ethyl acetate, ethanol, methanol, isoamyl acetate and hexyl acetate.

The dispersing medium in the light control suspension is preferably a liquid copolymer that fulfils a function of a dispersing medium in the light control suspension, adheres selectively on the light control particles to cover the particles, acts to be shifted to a droplet phase wherein the light control particles is phase-separated when the copolymer and the polymeric medium undergo a phase separation, has has no electroconductivity, and is not affinitive with the polymeric medium.

The dispersing medium is preferably, for example, a (meth)acrylic ester oligomer having a fluoro group and/or a hydroxyl group, and is more preferably a (meth)acrylic ester oligomer having a fluoro group and a hydroxyl group. When this liquid copolymer is used, the monomer unit of any one of the fluoro group and the hydroxide group is directed to the light control particles, and the other monomer unit acts in the polymeric medium to make the light control suspension be stably kept as droplets. For this reason, the light control particles are very homogeneously dispersed in the light control suspension. Thus, when the phase separation is caused, the light control particles are derived into the phase-separated droplets.

The (meth)acrylic ester oligomer having a fluoro group and/or a hydroxyl group may include a product obtained by copolymerizing a fluoro-group-containing monomer and/or a hydroxyl-group-containing monomer. Specific examples thereof include 2,2,2-trifluoroethyl methacrylate/butyl acrylate/2-hydroxyethyl acrylate copolymer, 3,5,5-trimethylhexyl acrylate/2-hydroxypropyl acrylate/fumaric acid copolymer, butyl acrylate/2-hydroxyethyl acrylate copolymer, 2,2,3,3-tetrafluoropropyl acrylate/butyl acrylate/2-hydroxyethyl acrylate copolymer, 1H,1H,5H-octafluoropentyl acrylate/butyl acrylate/2-hydroxyethyl acrylate copolymer, 1H,1H,2H,2H-heptadecafluorodecyl acrylate/butyl acrylate/2-hydroxyethyl acrylate copolymer, 2,2,2-trifluoroethyl methacrylate/butyl acrylate/2-hydroxyethyl acrylate copolymer, 2,2,3,3-tetrafluoropropyl methacrylate/butyl acrylate/2-hydroxyethyl acrylate copolymer, 1H,1H,5H-octafluoropentyl methacrylate/butyl acrylate/2-hydroxyethyl acrylate copolymer, and 1H,1H,2H,2H-heptadecafluorodecyl methacrylate/butyl acrylate/2-hydroxyethyl acrylate copolymer.

The (meth)acrylic ester oligomer more preferably has both of a fluoro group and a hydroxyl group.

About these (meth)acrylic ester oligomers, the standard-polystyrene-converted weight-average molecular weight, which is measured by gel permeation chromatography, is preferably within the range from 1,000 to 20,000, more preferably within the range from 2,000 to 10,000.

The use amount of a fluoro-group-containing monomer that is a raw material for each of these (meth)acrylic ester oligomers is preferably within the range from 6 to 12% by mole of the total of monomers that are raw materials therefor, and is more effectively within the range from 7 to 8% by mole thereof. If the use amount of the fluoro-group-containing monomer is more than 12% by mole, the refractive index becomes large so that the light transmittance tends to lower. The use amount of a hydroxyl-group-containing monomer that is a raw material for each of these (meth)acrylic ester oligomers is preferably within the range from 0.5 to 22.0% by mole, and is more effectively from within the range 1 to 8% by mole thereof. If the use amount of the hydroxyl-group-containing monomer is more than 22.0% by mole, the refractive index becomes large so that the light transmittance tends to lower.

The light control suspension used in the invention is a suspension wherein light control particles are dispersed in the dispersing medium so as to be fluidizable. The light control particles are preferably small needle crystals of a polyiodide that are produced by causing iodine and a iodide to react with a material selected from the group consisting of pyrazine-2, 3-dicarboxylic acid dihydrate, pyrazine-2,5-dicarboxylic acid dihydrate and pyridine-2,5-dicarboxylic acid monohydrate, which are each a precursor of the light control particles, in the presence of a polymeric dispersing agent which does not have affinitive power with a polymeric medium or a resin component of a polymeric medium, that is the resin (A) having substituents having ethylenically unsaturated bonds, and which makes it possible to make the dispersibility of the light control particles high. Usable examples of the polymeric dispersing agent include nitrocellulose. The iodide may be calcium iodide or the like. Examples of the polyiodide obtained as described above include compounds represented by the following general formulae:

$CaI_2(C_6H_4N_2O_4) \cdot XH_2O$ wherein X: 1 to 2, and $CaI_a(C_6H_4N_2O_4)_b \cdot cH_2O$ wherein a: 3 to 7, b: 1 to 2, and c: 1 to 3. These polyiodides are preferably needle crystals.

The light control particles used in the light control suspension for the light control film may be light control particles disclosed in the specifications of U.S. Pat. No. 2,041,138 (E. H. Land), U.S. Pat. No. 2,306,108 (Land et al.), U.S. Pat. No. 2,375,963 (Thomas), U.S. Pat. No. 4,270,841 (R. L. Saxe), and GB Patent No. 433,455. The crystals of the polyiodides known publicly by these patents are each produced by selecting any one of a pyrazine carboxylic acid or a pyridine carboxylic acid, and then reacting the acid with iodide, chorine or bromine so as to be turned to a polyhalide such as a polyiodide, polychloride or polybromide. The polyhalide is a complex compound wherein a halogen atom has reacted with an inorganic or organic material. Details of production processes thereof are disclosed in, for example, the specification of U.S. Pat. No. 4,422,963 by Saxe.

In the step of synthesizing the light control particles, it is preferred to use a polymeric material such as nitrocellulose as the polymeric dispersing agent as described above in order to make the size of the formed light control particles even and to improve the dispersibility of the light control particles in the specific suspending medium, as disclosed in Saxe. However, the use of nitrocellulose gives a crystal coated with nitrocellulose, and in the case of using this crystal as the light control particles, the light control particles are not suspended in droplets separated at the time of phase separation so that the particles may remain in the resin matrix. In order to prevent this, it is preferred to use a silicone resin having substituents including ethylenically unsaturated bonds as the resin (A), which has substituents including ethylenically unsaturated bonds, of the polymeric medium. In a case where the silicon resin is used at the time of producing the film, the light control particles are easily dispersed in fine droplets formed by phase separation. As a result, a better variability power can be obtained.

Besides the light control particles mentioned above, for example, the following may be used: an inorganic fiber such as carbon fiber, or a phthalocyanine compound such as τ type metal-free phthalocyanine or any metal phthalocyanine. In the phthalocyanine compound, examples of the central metal include copper, nickel, iron, cobalt, chromium, titanium, beryllium, molybdenum, tungsten, aluminum, and chromium.

In the invention, the size of the light control particles is preferably 1 μm or less, more preferably within the range from 0.1 to 1 μm, even more preferably within the range from 0.1 to 0.5 μm. If the size of the light control particles is more than 1 μm, problems making the transparency low may be caused, for examples, the particles may cause light scattering, or the orientation movement thereof in the light control suspension may be declined when an electric field is applied thereto. The size of the light control particles is defined as the volume-average particle diameter value measured by means of a submicron particle analyzer (for example, N4MD (manufactured by Beckman Coulter, Inc.)) according to photon correlation spectroscopy.

The light control suspension used in the invention is preferably composed of 1 to 70% parts by mass of light control particles and 30 to 99% parts by mass of a dispersing medium, and is more preferably composed of 4 to 50% parts by mass of light control particles and 50 to 96% parts by mass of a dispersing medium. It is preferred that the refractive index of the polymeric medium in the invention is close to that of the dispersing medium therein. Specifically, the difference in refractive index between the polymeric medium and the dispersing medium in the invention is preferably 0.005 or less, more preferably 0.003 or less. The light control material contains the light control suspension usually in an amount of 1 to 100 parts by mass, preferably in that of 6 to 70 parts by mass, even more preferably in that of 6 to 60 parts by mass relative to 100 parts by mass of the polymeric medium.

<Transparent Electroconductive Resin Substrates>

In general, the transparent electroconductive resin substrates used when the light control material according to the invention is used to produce a light control film may each be a transparent electroconductive resin substrate having a light transmittance of 80% or more and having a surface resistance value of 3 to 3000Ω wherein a transparent resin substrate is coated with a transparent electroconductive film (such as an ITO, $SnO_2$, $In_2O_3$ or organic electroconductive film). The light transmittance of the transparent resin substrate can be measured in accordance with the method for measuring total light ray transmittance in JIS K7105. The transparent resin substrate may be, for example, a polymeric film.

The polymeric film is, for example, a film of a polyester such as polyethylene terephthalate, a film of a polyolefin such as polypropylene, a polyvinyl chloride film, an acrylic resin film, a polyethersulfone film, a polyarylate film, a polycarbonate film or some other resin film. A polyethylene terephthalate film is preferred since the film is excellent in transparency, formability, bondability, workability, and others.

The thickness of the transparent electroconductive film, with which the transparent resin substrate is coated, is preferably within the range from 10 to 5,000 nm, and the thickness of the transparent resin substrate is not particularly limited. When the substrate is, for example, a polymeric film, the thickness is preferably within the range from 10 to 200 μm. In order to prevent a short circuit phenomenon generated by a matter that the gap between the substrates is narrow so that the incorporation of an alien substance, and others are generated, it is allowable to use transparent resin electroconductive substrates in each of which a transparent insulating layer having a thickness within the range of several nanometers to about 1 μm is formed on a transparent electroconductive film. Also when the light control film of the invention is used for a reflection type light control window (for example, a rear viewing mirror for a car), it is allowable that thin films made of an electroconductive metal such as aluminum, gold or silver are directly used as electrodes.

<Light Control Film>

The light control film of the invention can be formed by use of a light control material. The light control material is composed of a resin matrix made of a polymeric medium, and a light control suspension dispersed in the resin matrix, and forms a light control layer. The light control layer is sandwiched between two transparent electroconductive resin substrates each having a primer layer for improving the adhesiveness between the substrate and the light control layer, or is sandwiched between two transparent electroconductive resin substrates one of which has a primer layer and the other of which has no primer layer.

In order to obtain the light control film, a liquid light control suspension is first mixed with a polymeric medium into a homogeneous form to yield a light control material made of a mixed liquid wherein the light control suspension is dispersed, in a droplet state, in the polymeric medium.

Specifically, this step is as follows: A liquid wherein light control particles are dispersed in a solvent is mixed with a dispersing medium of a light control suspension, and then the solvent is distilled off by means of a rotary evaporator or the like to produce a light control suspension.

Next, the light control suspension and a polymeric medium are mixed with each other to prepare a mixed liquid (light control material) wherein the light control suspension is dispersed, in a droplet state, in the polymeric medium.

This light control material is applied in a constant thickness onto a transparent electroconductive resin substrate having a primer layer, and optionally the solvent is removed by drying. Thereafter, a high-pressure mercury lamp or the like is used to radiate ultraviolet rays thereto so as to cure the polymeric medium. As a result, a light control layer is formed wherein the light control suspension is dispersed, in the form of droplets, in a resin matrix made of the cured polymeric medium. By changing the blend ratio between the polymeric medium and the light control suspension variously, the light transmittance of the light control layer can be adjusted. By adhering, onto the thus-formed light control layer, another transparent electroconductive resin substrate having a primer layer, a light control film is obtained. Alternatively, the following is allowable: the light control material is applied in a constant thickness onto a transparent electroconductive resin substrate having a primer layer, and optionally the solvent is removed by drying; thereafter, the other transparent electroconductive resin substrate having a primer layer is laminated thereon; and then the lamination is irradiated with ultraviolet rays to cure the polymeric medium. Only one of the transparent electroconductive resin substrates may be used as a transparent electroconductive resin substrate having a primer layer. It is allowable to form a light control layer on each of two transparent electroconductive resin substrates, and then laminate the substrates onto each other so that the light control layers adhere onto each other. The thickness of the light control layer is preferably within the range from 5 to 1,000 μm, more preferably within the range from 20 to 100 μm.

The size (average droplet diameter) of the droplets of the light control suspension dispersed in the resin matrix is usually within the range from 0.5 to 100 μm, preferably within the range from 0.5 to 20 μm, and more preferably within the range from 1 to 5 μm. The size of the droplets is decided by the concentrations of the individual components constituting the light control suspension, the viscosities of the light control suspension and the polymeric medium, the compatibility of the dispersing medium in the light control suspension with the polymeric medium, and others. The average droplet diameter can be calculated, for example, by using an SEM to take a photograph or some other images of the light control film from the direction toward one of its surface, measuring the diameters of arbitrarily-selected ones out of droplets therein, and then getting the average value thereof. The diameter can also be calculated by taking a viewing angle image of the light control film through an optical microscope, as digital data, into a computer, and then applying an image processing integration software thereto.

The primer treatment (formation of the primer layer) of the transparent electroconductive resin substrate in the invention can be conducted by applying a material that forms the primer layer onto the transparent electroconductive resin substrate by using, alone or in combination, a bar coater method, a Mayer bar coater method, an applicator method, a doctor blade method, a roll coater method, a die coater method, a comma coater method, a gravure coating method, a microgravure coating method, a roll brush method, a spray coating method, an air knife coating method, an impregnating method, a curtain coating method and/or some other method. At the time of the applying, it is allowable to dilute the material with an appropriate solvent if necessary, to use the solution of the material that forms the primer layer. When the solvent is used, it is necessary to dry the resultant after applying the solution onto the transparent electroconductive resin substrate. The applied film that is to turn to the primer layer may be formed onto only one surface of the film, or onto each surface thereof if necessary.

The solvent used to form the primer layer may be any solvent, as long as it is capable of dissolving the material that forms the primer layer therein, and can be removed by drying or the like after the formation of the primer layer. The solvent may be methyl ethyl ketone, acetone, tetrahydrofuran, toluene, heptane, cyclohexane, ethyl acetate, ethanol, methanol, isoamyl acetate, hexyl acetate, or the like. A mixed solvent thereof may be used.

For the applying of the light control material that is to turn to the light control layer, a known coating means may be used, examples thereof including a bar coater, an applicator, a doctor blade, a roll coater, a die coater and a comma coater. The light control material is applied onto the surface of one of the primer layers laid on the transparent electroconductive resin substrates. Alternatively, in the case of using a transparent electroconductive resin substrate having no primer layer as one of the transparent electroconductive resin substrates, the light control material may be applied directly onto the transparent electroconductive resin substrate. At the time of the applying, the material may be diluted with an appropriate solvent as the need arises. When the solvent is used, it is necessary to dry the resultant after applying the solution onto one of the transparent electroconductive resin substrates.

The solvent used to apply the light control material may be tetrahydrofuran, toluene, heptane, cyclohexane, ethyl acetate, ethanol, methanol, isoamyl acetate, hexyl acetate, or the like. A mixed solvent thereof may be used.

In order to form a film wherein a liquid light control suspension is dispersed, in the form of fine droplets, in a solid resin matrix, the following method may be used: a method of mixing the components of the light control material with each other by a homogenizer, an ultrasonic homogenizer, or the like to disperse the light control suspension finely into the polymeric medium; a phase separation method based on the polymerization of the resin component in the polymeric medium; a phase separation method based on solvent volatilization; a phase separation method dependent on temperature, or the like.

According to the above-mentioned method, provided is a light control film capable of adjusting the light transmittance thereof arbitrarily by the formation of an electric field. When no electric field is formed, the light control film keeps a vivid coloration state giving no light scattering and when an electric field is formed, the film is turned into a transparent state. The power for this exhibits a characteristic of 200000 or more reversible repetitions. In order to increase the light transmittance in the transparent state and increase the vividness in the coloration state, it is preferred to make the refractive index of the liquid light control suspension consistent with that of the resin matrix.

The power source used to operate the light control film may be rendered an alternating power source giving a voltage of 10 to 100 V (effective value) and a frequency range of 30 Hz to 500 kHz. About the light control film of the invention, the response time to an electric field is set into the range of 1 to 50 seconds when the film is achromatic, and into that of 1 to 100 seconds when the film is colored. About the endurance against ultraviolet rays, results of an ultraviolet ray radiating test using 750-W ultraviolet rays demonstrate that a stable variability property is exhibited even when 250 hours elapse. When the light control film is allowed to stand still at −50 to 90° C. over a long term, an initial variability property can be kept.

In the case of making use of a conventionally technical method for the production of a light control film using a liquid crystal, when a method based on an emulsion using water is used, the liquid crystal reacts with water so that the light control property is lost in many cases. Thus, there remains a problem that films having the same properties are not easily produced.

In the invention, not a liquid crystal but a liquid light control suspension wherein light control particles are dispersed is used. Therefore, also when no electric field is applied thereto, the film of the invention does not cause light scattering, which is different from a situation according to any light control film wherein a liquid crystal is used. Thus, the film of the invention shows a coloration state that is excellent in vividness and gives no restriction to the view angle. The light variability degree can be adjusted at will by the content of the light control particles, the droplet form, the thickness of the film, or the electric field intensity.

Since no liquid crystal is used in the light control film of the invention, the following can be overcome: a change in the color tone by irradiation with ultraviolet rays; a fall in the variability power; and a response time lag following a voltage drop generated between the periphery of the transparent electroconductive resin substrates and the center thereof, the lag being peculiar to large-sized products.

When no electric field is applied to the light control film of the invention, the film exhibits a vivid coloration state by optical absorption or dichroic effect of the light control particles because of Brownian motion of the light control particles in the light control suspension. However, when an electric field is applied thereto, the light control particles in the droplets or in droplet-connected body are arranged in parallel to the electric field so that the film is turned into a transparent state. Since the light control film is in a film state, solved are problems of a light control glass according to the prior art, wherein a liquid light control suspension is used as it is, that is, a difficulty in the injection of a liquid suspension to a gap between two transparent electroconductive resin substrates, a swelling phenomenon at the lower region of the product caused by a hydraulic pressure difference between the upper and lower regions of the product, a local change in the color tone caused by a change in the interval between the substrates through external environments, for example, the pressure of wind, and a leakage of the light control material caused by the breaking of a sealing member between the transparent electroconductive substrates.

Overcome are also a change in the color tone by irradiation with ultraviolet rays, a fall in the variability power, and a response time lag following a voltage drop generated between the periphery of the transparent electroconductive resin substrates and the center thereof, the lag being typical to large-sized products. En the case of a light control window according to the prior art using a liquid crystal, the liquid crystal is easily deteriorated by ultraviolet rays, and further the range of the use temperature thereof is also narrow because of thermal characteristics of the liquid crystal, which is nematic liquid crystal. Furthermore, about optical characteristics thereof, the light control window shows a milky white, semitransparent state based on light scattering when no electric field is applied. When an electric field is applied, the light control window does not turn vivid completely to result in a problem that the opacified state remains. Accordingly, in such a light control window, a display function based on the shutout and transmission of light, which are used as an operation principle for existent liquid crystal display elements, cannot be attained. However, the use of the light control film of the invention makes it possible to solve this problem.

The light control film of the invention is an excellent light control film that is strong in the adhesiveness between the light control layer and the transparent electroconductive resin substrates, thereby not causing a problem that the light control layer is peeled from the transparent electroconductive resin substrates in the production step of the film, or in a processing step after the production or some other step.

The light control film of the invention can be preferably used for, e.g., an indoor or outdoor partition; a window glass or skylight for building; various flat display elements used in the electronic industry and for imaging instruments; alternate products for various gauge boards and existing liquid crystal display elements; a light shutter; various indoor and outdoor advertisement and guide indicating boards; window glasses for an aircraft, a railway vehicles and a ship; window glasses, a back mirror and a sun roof for a car; eyeglasses; sunglasses; a sun visor; and other articles.

The light control film of the invention may be directly used in connection of the use method thereof. In accordance with a purpose of the use, for example, the light control film of the invention may be used in the state that the film is sandwiched between two substrates, or in the state that the film is adhered onto a single surface of a substrate. The substrate may be, for example, a glass, or a polymeric film equivalent to the above-mentioned transparent resin substrates.

The structure and the operation of the light control film of the invention will be described in more detail with reference to the drawings. They are as follows:

FIG. 1 is a schematic view of the structure of a light control film of an embodiment of the invention. A light control layer 1 is sandwiched between transparent electroconductive resin substrates 4 made of two transparent resin substrates 5b, respectively, which are each coated with a transparent electroconductive film 5*a*. Between the light control layer 1 and each of the transparent electroconductive resin substrates 4 is arranged a primer layer 6. By switching a switch 8, a power source 7 is connected or disconnected to the two transparent electroconductive films 5. The light control layer 1 is composed of: a film-form resin matrix 2, as a polymeric medium, obtained by curing a resin (A) having substituents including ethylenically unsaturated bonds, which has been described above, by ultraviolet rays; and a liquid light control suspension dispersed, in the form in of droplets 3, in the resin matrix 2.

Figure 2:
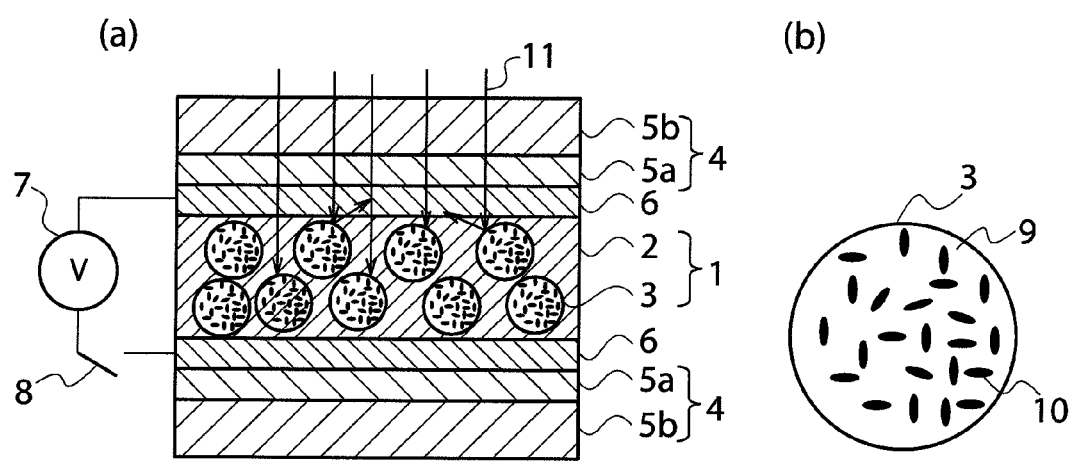
FIG. 2 The figures are each a schematic view referred to in order to describe the operation of the light control film in FIG. 1 when no electric field is applied thereto.

FIG. 2 are each a schematic view referred to in order to describe the operation of the light control film in FIG. 1, and each illustrate a case where the switch 8 is turned off to apply no electric field. In this case, incident rays 11 are absorbed, scattered or reflected in or on light control particles 10 dispersed in a dispersing medium 9 constituting the droplets 3 of the liquid light control suspension by Brownian motion of the light control particles 10. Thus, the rays 11 cannot be transmitted.

Figure 3:
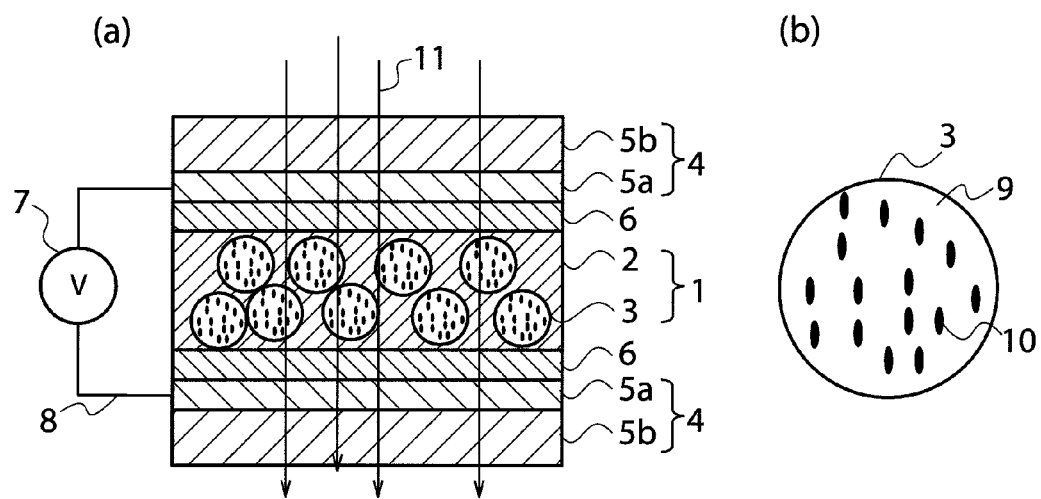
FIG. 3 The figures are each a schematic view referred to in order to describe the operation of the light control film in FIG. 1 when an electric field is applied thereto.

As illustrated in FIG. 3, however, when the switch 8 is connected to apply an electric field, the light control particles 10 are arranged in parallel to an electric field formed by the applied electric field so that the incident rays 11 come to pass between the arranged light control particles 10. In this way, a light transmitting function causing neither scattering nor a fall in the transparency is produced.

EXAMPLES

The present invention will be more specifically described by way of examples of the invention and comparative examples hereinafter. However, the invention is not limited by these examples.

(Production Example of Light Control Particles)

In order to produce light control particles, in a 500 ml four-necked flask equipped with a stirrer and a cooling tube, 4.5 g of iodide (JIS extra pure reagent, manufactured by Wako Pure Chemical Industries, Ltd.) was added to a solution composed of 87.54 g of a 15% by mass solution of nitrocellulose, ¼ LIG ((trade name) manufactured by Bergerac N.C.), diluted with isoamyl acetate (extra pure reagent, manufactured by Wako Pure Chemical Industries, Ltd.), 4.96 g of isoamyl acetate, 4.5 g of dehydrated $CaI_2$ (manufactured by Wako Pure Chemical Industries, Ltd., for chemical), 2.0 g of anhydrous ethanol (manufactured by Wako Pure Chemical Industries, Ltd., for organic synthesis), and 0.6 g of purified water (purified water, manufactured by Wako Pure Chemical Industries, Ltd.). Thereto was added 3 g of pyrazine-2,5-dicarboxylic acid dihydrate (manufactured by PolyCarbon Industries), as material for forming a light-control-particle-base. The liquid was stirred at 45° C. for 3 hours to end the reaction, and then the dispersant was dispersed with an ultrasonic disperser for 2 hours. At this time, the color tone of the mixed liquid was changed from brown to dark navy-blue.

Next, in order to remove light control particles having given sizes from the reaction solution, a centrifugal separator was used to separate the light control particles. The reaction solution was centrifuged at a rate of 750 G for 10 minutes to remove the precipitation, and further centrifuged at 7390 G for 2 hours to remove the suspended matter. In this way, the precipitation particles were collected. The precipitation particles were a needle crystal having an average particle diameter of 0.36 µm, the diameter being measured by means of a submicron particle analyzer (N4MD, manufactured by Beckman Coulter, Inc.). The precipitation particles were used as light control particles.

(Production Example of Light Control Suspension)

To 50 g of the following copolymer as a dispersing medium for a light control suspension were added 45.5 g of the light control particles yielded in the item (Production Example of Light Control Particles): a butyl acrylate (Wako extra pure class, manufactured by Wako Pure Chemical Industries, Ltd.)/2,2,2-trifluoroethyl methacrylate (manufactured by Kyoeisha Chemical Co., Ltd., for industry)/2-hydroxyethyl acrylate (Wako first class, manufactured by Wako Pure Chemical Industries, Ltd.) copolymer (mole ratio between the monomers: 18/1.5/0.5, weight-average molecular weight: 2,000, and refractive index: 1.4719). A stirrer was used to mix the components for 30 minutes. Next, a rotary evaporator was used to remove isoamyl acetate in a vacuum under a reduced pressure of 133 Pa at 80° C. for 3 hours to produce a stable liquid light control suspension wherein neither the precipitation of the light control particles nor any aggregating phenomenon was caused.

(Production Example of Energy Ray Curable Silicone Resin)

Into a four-necked flask equipped with a Dean-Stark trap, a cooling tube, a stirrer and a heating device were charged 17.8 g of a silanol-both-terminated polydimethylsiloxane (reagent, manufactured by Chisso Corp.), 62.2 g of a silanol-both-terminated polydimethyldiphenylsiloxane (reagent, manufactured by Chisso Corp.), 20 g of (3-acryloxypropyl) methyldimethoxysilane (reagent, manufactured by Chisso Corp.), and 0.1 g of tin 2-ethylhexane (manufactured by Wako Pure Chemical Industries, Ltd.). In heptane, the solution was refluxed at 100° C. for 3 hours to conduct a reaction.

Next, thereto was added 25 g of trimethylethoxysilane (reagent, manufactured by Chisso Corp.), and the resultant was refluxed for 2 hours to perform a dealcoholization, and then a rotary evaporator was used to remove heptane in a vacuum under a reduced pressure of 100 Pa at 80° C. for 4 hours to yield an energy ray curable silicone resin having a weight-average molecular weight of 35000, and a refractive index of 1.4745. From the hydrogen integrated-intensity ratio according to NMR, the concentration of ethylenically unsaturated bonds in this resin was 0.31 mol/kg. The ethylenically unsaturated bond concentration was measured by a method described below.

[Method for Measuring Ethylenically Unsaturated Bond Concentration]

The ethylenically unsaturated bond concentration (mol/kg) was measured from the hydrogen integrated-intensity ratio according to NMR (using an integrated value of hydrogen in the ethylenically unsaturated bond near 6 ppm, an integrated value of hydrogen in phenyl groups near 7.5 ppm, and an integrated value of hydrogen in methyl groups near 0.1 ppm). The solvent for the measurement was rendered $CDCl_3$.

In the resin produced as described above, the ratio by mass calculated out from the hydrogen integrated-intensity ratio according to NMR was as follows: the methyl groups/the phenyl groups/the ethylenically unsaturated groups was 11/6.4/1. The proportion of the ethylenically unsaturated groups in the whole was 5.4%, and the number of the ethylenically unsaturated groups per molecule was 9.35 from the individual molecular weights. Thus, the mole number per kilogram was calculated into 0.31 mol/kg.

Example 1

The light control suspension yielded in the item (Production Example of Light Control Suspension), the weight of which was 2.5 g, was added to 10 g of the energy ray curable silicone resin yielded in the item (Production Example of Energy Ray Curable Silicone Resin), 0.2 g of bis(2,4,6-trimethylbenzoyl)phenylphosphine oxide (manufactured by Ciba Specialty Chemicals Inc.) as a polymerization initiator, and 0.3 g of dibutyltin dilaurate as an anti-coloring agent. The liquid was mechanically stirred for 1 minute to produce a light control material.

Separately, a Mayer bar coating method was used to apply a solution wherein PM-21 (Nippon Kayaku Co., Ltd.) having a structure illustrated below, as a phosphoric diester, was dissolved in methyl ethyl ketone to give a concentration of 0.3% by mass onto the whole of a surface of a polyester film (TETOLIGHT TCF, manufactured by Oike & Co., Ltd., thickness: 125 μm), the surface electric resistance value of the film being from 200 to 700Ω, coated with a transparent electroconductive film (thickness: 300 Å) made of ITO (indium tin oxide). The resultant was dried at 70° C. for 1 minute to form a primer layer.

[formula 11]

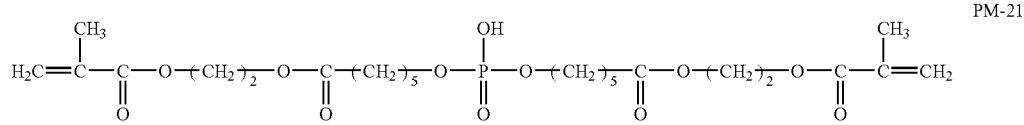

The light control material yielded as described above was applied onto the whole of the transparent electroconductive resin substrate, on which the primer layer was formed. Next, thereon was laminated another transparent electroconductive resin substrate, on which a primer layer was formed in the same manner, so as to direct the primer-layer-solution-applied surface onto the applied layer of the light control material, and then they were adhered closely onto each other. A metal halide lamp was used to radiate ultraviolet rays, 3000 mJ/cm$^2$ in intensity, thereon from the polyester film sides of the laminated transparent electroconductive resin substrates, so as to produce a light control film, 340 μm in thickness, composed of the following: a film-form light control layer of 90 μm thickness wherein the light control suspension was dispersed, in the form of spherical droplets, in the resin matrix cured by the ultraviolet rays; and the transparent electroconductive resin substrates, between which the light control layer was sandwiched.

A spectroscopic ellipsometer, M-2000D (manufactured by J. A. Woolam Japan Co., Inc.), was used to measure the thickness of each of the formed primer layers. As a result, the thickness was 2 nm.

Figure 4:
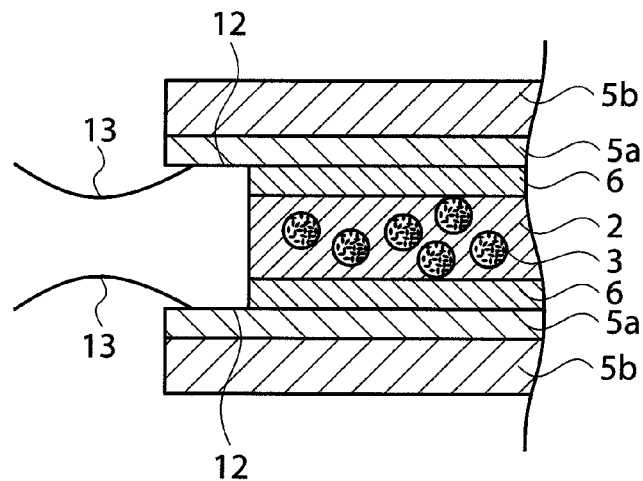
FIG. 4 The figure is a schematic view referred to in order to describe the state of an end region of the light control film.

Next, from an end region of this light control film, the light control layer was removed to expose the region in order to attain electric conduction, for the application of a voltage, between end regions of the transparent electroconductive films (see FIG. 4).

The size (average droplet diameter) of the droplets of the light control suspension in the light control film was 3 μm on average. The light transmittance of the light control film was 1.1% when no alternating voltage was applied thereto. When an alternating voltage of 50 V (effective value) having a frequency of 400 Hz was applied, the light transmittance of the light control film was 33%. The ratio between the light transmittance when the electric field was applied and that when no electric field was applied was as large as 30, and was good.

The end region of the light control film (the region where the light control layer was removed so that the transparent electroconductive film was exposed) was visually observed. As a result, curves of the transparent electroconductive resin substrates toward the center of the light control film in the thickness direction were very small (see FIG. 4). Measurements as described below were made for evaluations of the size of the droplets of the light control suspension in the light control film, the light transmittance of the light control film, the bonding strength between the light control layer and the transparent electroconductive resin substrates, the peeling mode, the transferability, and the tackiness.

[Method for Measuring Size of Proplets of Light Control Suspension]

An SEM photograph of the light control film was taken from one of directions toward the surfaces of the light control film. The diameters of arbitrarily-selected ones out of droplets therein were measured, and the average value thereof was calculated.

[Method for Measuring Light Transmittance of Light Control Film]

A spectroscopic color-difference meter SZ-Σ90 (manufactured by Nippon Denshoku Industries Co., Ltd.) was used to measure the Y value (%) in the state that the used light source was an A light source and the view angle was set to 2 degrees. The Y value was defined as the light transmittance. The light transmittance was measured when an electric field was applied as well as when no electric field was applied.

[Method for Measuring Bonding Strength of Light Control Layer]

The bonding strength was measured using a rheometer, STROGRAPH E-S (manufactured by Toyo Seiki Seisakusho Ltd.), under the following conditions: the peeling angle was 90°; the loading weight was 50 N; and the pulling-up speed was 50 mm/min.

[Method for Evaluating Peeling Mode]

About the light control film from which the transparent electroconductive resin substrates were peeled, the film being obtained after the measurement of the above bonding strength, the manner of peeling the transparent electroconductive resin substrates from the light control film was evaluated in accordance with an evaluation criterion decided as described below. A case where the light control layer remained on each of the two transparent electroconductive resin substrates and, at the time of the peeling, the inside of the light control layer was broken, was defined as aggregation breaking. A case where the light control layer remained on only one of the transparent electroconductive resin substrates and, at the time of peeling, the light control layer itself was not broken (only the substrate was peeled) was defined as interfacial peeling.

[Method for Evaluating Transferability]

Any one of the primer layers was put onto a PET surface of an ITO/PET product, and then a weight of about 1 kg was put on the matter. In this state, the matter was stored for one week, and it was then visually checked whether or not the primer layer was transferred on the PET surface of the ITO/PET product. A case where the proportion of the transferred area was 5% or less of the whole of the primer-applied area was evaluated as A; a case where the proportion was from 5 to 30%, B; and a case where the proportion was 30% or more, C.

[Method for Evaluating Tackiness]

The tackiness of the primer-layer-formed ITO/PET (any one of the primer-layer-formed transparent electroconductive resin substrates produced in Example 1 before the light control layer was formed) was evaluated as follows:

First, a light control material was applied onto the primer-layer-formed ITO/PET (any one of the primer-layer-formed transparent electroconductive resin substrates produced in Example 1 before the light control layer was formed).

When the light control film was produced in a roll-to-roll manner, the other primer-layer-formed ITO/PET (the other primer-layer-formed transparent electroconductive resin substrate produced in Example 1 before the light control layer was formed) was laminated onto the above-mentioned substrate, on which the light control material had already been formed. At this time, it is necessary to adjust the position of the other primer-layer-formed ITO/PET delicately, so as to put the two onto each other precisely in the painting direction and the vertical direction. A case where the position adjustment was able to be easily attained in the state that the primer layer of the other primer-layer-formed ITO/PET contacted a tension-applying metal roll was evaluated as A; a case where the adjustment was not easily attained but was allowable, B; and a case where the position adjustment was difficult, C.

Example 2

Light control films were produced and various properties thereof were measured in the same way as in Example 1 except that the solution when the primer layers were formed was changed to 0.5, 1.0, 5.0 and 10% by mass solutions of PM-21 (Nippon Kayaku Co., Ltd.) used as a phosphoric diester in methyl ethyl ketone, respectively. The thicknesses of the formed primer layers were 3 nm (0.5% by mass), 22 nm (1.0% by mass), 89 nm (5.0% by mass), and 162 nm (10% by mass), respectively.

Example 3

A light control film was produced and various properties thereof were measured in the same way as in Example 1 except that the solution when the primer layers were formed was changed to a 0.3% by mass solution of P-2M (Kyoeisha Chemical Co., Ltd.) having a structure illustrated below, which was used as a phosphoric diester, in methyl ethyl ketone. The thickness of each of the formed primer layers was measured by use of a spectroscopic ellipsometer, M-2000D (manufactured by J. A. Woolam Japan Co., Inc.). As a result, the thickness was 3 nm.

[formula 12]

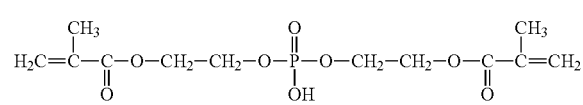

P-2M

Example 4

Light control films were produced and various properties thereof were measured in the same way as in Example 1 except that the solution when the primer layers were formed was changed to 0.5, 1.0, 5.0 and 10% by mass solutions of P-2M (Kyoeisha Chemical Co., Ltd.) used as a phosphoric diester in methyl ethyl ketone, respectively. The thicknesses of the formed primer layers were 3 nm (0.5% by mass), 27 nm (1.0% by mass), 92 nm (5.0% by mass), and 171 nm (10% by mass), respectively.

Example 5

A light control film was produced and various properties thereof were measured in the same way as in Example 1 except that the solution when the primer layers were formed was changed to a 1.0% by mass solution of PHOSMER PP (Uni-Chemical Co., Ltd.) having a structure illustrated below, which was used as a phosphoric monoester, in methyl ethyl ketone. The thickness of each of the formed primer layers was 25 nm.

[formula 13]

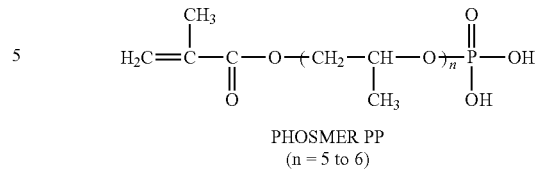

PHOSMER PP
(n = 5 to 6)

Example 6

A light control film was produced and various properties thereof were measured in the same way as in Example 1 except that the solution when the primer layers were formed was changed to a 5.0% by mass solution of PHOSMER PP (Uni-Chemical Co., Ltd.) used as a phosphoric monoester in methyl ethyl ketone. The thickness of each of the formed primer layers was 84 nm.

Example 7

A light control film was produced and various properties thereof were measured in the same way as in Example 1 except that the solution when the primer layers were formed was changed to a 1.0% by mass solution of PHOSMER PE (Uni-Chemical Co., Ltd.) having a structure illustrated below, which was used as a phosphoric monoester, in methyl ethyl ketone. The thickness of each of the formed primer layers was 24 nm.

[formula 14]

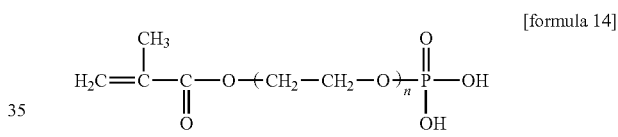

PHOSMER-PE (n = 4 to 5)

Example 8

A light control film was produced and various properties thereof were measured in the same way as in Example 1 except that the solution when the primer layers were formed was changed to a 5.0% by mass solution of PHOSMER PE (Uni-Chemical Co., Ltd.) used as a phosphoric monoester in methyl ethyl ketone. The thickness of each of the formed primer layers was 87 nm.

Example 9

A light control film was produced and various properties thereof were measured in the same way as in Example 1 except that the solution when the primer layers were formed was changed to a 1.0% by mass solution of PHOSMER M (Uni-Chemical Co., Ltd.) used as a phosphoric monoester in methyl ethyl ketone. The thickness of each of the formed primer layers was 23 nm.

[formula 15]

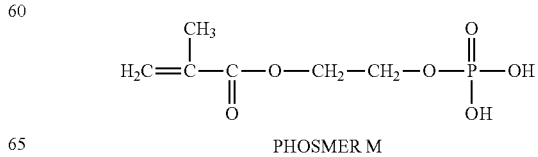

PHOSMER M

Example 10

A light control film was produced and various properties thereof were measured in the same way as in Example 1 except that the solution when the primer layers were formed was changed to a 5.0% by mass solution of PHOSMER M (Uni-Chemical Co., Ltd.) used as a phosphoric monoester in methyl ethyl ketone. The thickness of each of the formed primer layers was 101 nm.

Example 11

A light control film was produced and various properties thereof were measured in the same way as in Example 1 except that the solution when the primer layers were formed was changed to a 1.0% by mass solution of RDX63182 (Daicel-UCB Co., Ltd.) used as a phosphoric acid modified epoxy acrylate (phosphoric-acid esterification-bonded epoxy acrylate) in methyl ethyl ketone. The thickness of each of the formed primer layers was 31 nm.

Example 12

A light control film was produced and various properties thereof were measured in the same way as in Example 1 except that the solution when the primer layers were formed was changed to a 5.0% by mass solution of RDX63182 (Daicel-UCB Co., Ltd.) used as a phosphoric acid modified epoxy acrylate (phosphoric-acid esterification-bonded epoxy acrylate) in methyl ethyl ketone. The thickness of each of the formed primer layers was 107 nm.

Example 13

A light control film was produced and various properties thereof were measured in the same way as in Example 1 except that the solution when the primer layers were formed was changed to a 3.0% by mass solution of KBM-603 (Shin-Etsu Silicone Co., Ltd.) having a structure illustrated below, which was used as a silane coupling agent having an amino group, in ethanol. The thickness of each of the formed primer layers was 68 nm.

[formula 16]

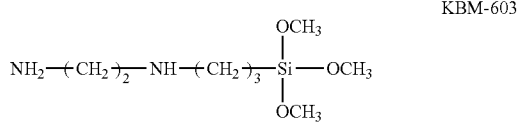

Example 14

A light control film was produced and various properties thereof were measured in the same way as in Example 1 except that the solution when the primer layers were formed was changed to a 5.0% by mass solution of KBM-603 (Shin-Etsu Silicone Co., Ltd.) used as a silane coupling agent having an amino group in ethanol. The thickness of each of the formed primer layers was 102 nm.

Example 15

A light control film was produced and various properties thereof were measured in the same way as in Example 1 except that the solution when the primer layers were formed was changed to a 10.0% by mass solution of KBM-603 (Shin-Etsu Silicone Co., Ltd.) used as a silane coupling agent having an amino group in ethanol. The thickness of each of the formed primer layers was 188 nm.

Comparative Example 1

A light control film was produced and various properties thereof were measured in the same way as in Example 1 except that no primer layer was formed on each of transparent electroconductive resin substrates that was a polyester film (trade name: TETOLIGHT TCF, manufactured by Oike & Co., Ltd., thickness: 125 μm) coated with a transparent electroconductive film made of ITO, and the substrates were used as they were.

Comparative Example 2

A light control film was produced and various properties thereof were measured in the same way as in Example 1 except that the solution when the primer layers were formed was changed to a 1.0% by mass solution of a silane coupling agent having an epoxy group, KBM-403 (Shin-Etsu Silicone Co., Ltd.), which is represented by a formula illustrated below, in ethanol. The thickness of each of the formed primer layers was 33 nm.

Comparative Example 3

Light control films were produced and various properties thereof were measured in the same way as in Example 1 except that the solution when the primer layers were formed was changed to 1.0, 5.0 and 10% by mass solutions of a silane coupling agent having a methacryloyl group, KBM-503 (Shin-Etsu Silicone Co., Ltd.), which is represented by a formula illustrated below, in ethanol, respectively. The thicknesses of the formed primer layers were 30 nm (1.0% by mass), 98 nm (5.0% by mass), and 185 nm (10% by mass), respectively.

Comparative Example 4

Light control films were produced and various properties thereof were measured in the same way as in Example 1 except that the solution when the primer layers were formed was changed to 1.0, 5.0 and 10% by mass solutions of a silane coupling agent having a mercapto group, KBM-803 (Shin-Etsu Silicone Co., Ltd.), which is represented by a formula illustrated below, in ethanol, respectively. The thicknesses of the formed primer layers were 34 nm (1.0% by mass), 99 nm (5.0% by mass), and 190 nm (10% by mass), respectively.

[formula 17]

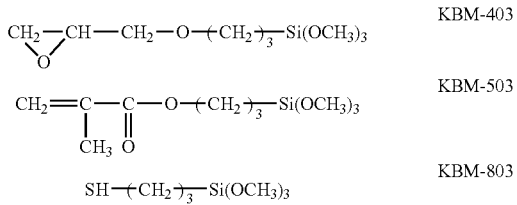

Comparative Examples 5 to 8

Light control films were produced and various properties thereof were measured in the same way as in Example 1 except that the solution when the primer layers were formed was changed to 10% by mass solutions of polyvinyl acetal resins (S-LEC B series (BL-1, BL-1H and BL-S): polyvinyl butyral resins, and S-LEC K series (KS-10):special polyvinyl acetal resins), which are each represented by a formula illustrated below, in mixed ethanol and toluene (ethanol: toluene=4:6) manufactured by Sekisui Chemical Co., Ltd., respectively. The thicknesses of the formed primer layers were 203 nm (S-LEC BL-1), 211 nm (S-LEC BL-1H), 228 nm (S-LEC BL-S), and 208 nm (S-LEC KS-10), respectively.

[formula 18]

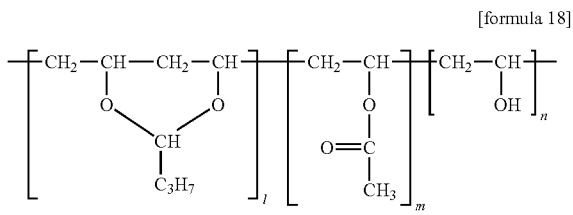

Comparative Example 9

Prepared was a 1000 mL separable flask equipped with a Dean-Stark reflux condenser, a thermostat, and a stirrer. Into the flask were incorporated 15.0 mmol of polyoxypropylenediamine and 105.0 mmol of 2,2-bis[4-(4-aminophenoxy)phenyl]hexafluoropropane as diamine compounds, and 287 g of N-methyl-2-pyrrolidone (NMP) as an aprotic polar solvent, and then a solution was stirred at room temperature for 30 minutes.

Next, thereto were added 180 g of toluene as an aromatic hydrocarbon organic solvent azeotropic with water, and 114.0 mmol of 4,4'-hexafluoropropylidenebisphthalic acid dihydrate as a tetracarboxylic acid dihydrate, and then the temperature of the system was raised to 50° C. At the temperature, the solution was stirred for 1 hour, and then the temperature of the system was further raised to 160° C. to reflux the solution for 3 hours. After it was verified that a theoretical amount of water was collected in a water quantitatively—collecting vessel and the outflow of water came not to be observed, water and toluene in the water quantitatively—collecting vessel were removed. The temperature of the system was raised to 180° C. to remove toluene in the reaction solution, thereby yielding a polyimide resin represented by a formula illustrated below in NMP solution.

The NMP solution of the polyimide resin was charged into methanol, and the resultant precipitation was collected. Thereafter, the precipitation was pulverized, and dried to yield a polyimide resin. The weight-average molecular weight of the resultant polyimide resin was 112000.

[formula 19]

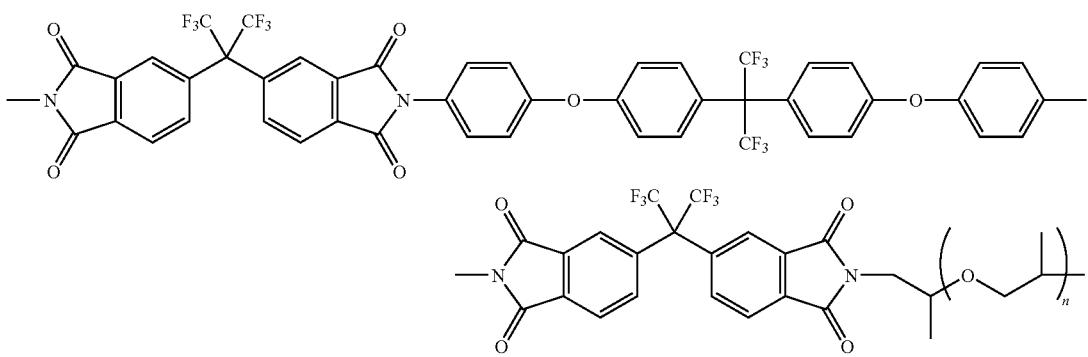

A light control film was produced and various properties thereof were measured in the same way as in Example 1 except that the solution when the primer layers were formed was changed to a 5.0% by mass solution of the polyimide resin in methyl ethyl ketone. The thickness of each of the formed primer layers was 121 nm.

Comparative Example 10

A light control film was produced and various properties thereof were measured in the same way as in Example 1 except that the solution when the primer layers were formed was changed to a 5.0% by mass solution of EB3702 (Daicel-UCB Co., Ltd.) used as an aliphatic acid modified epoxy acrylate in methyl ethyl ketone. The thickness of each of the formed primer layers was 106 nm.

These results are shown in Tables 1 to 3.

TABLE 1

| Items | Material for primer (wt %) | Thickness (nm) | Light transmittance when electric field applied (%) | Light transmittance when no electric field applied (%) | Bonding Strength (N/m) | Tackiness | Transferability | Peeling Mode |
|---|---|---|---|---|---|---|---|---|
| Example 1 | PM-21: 0.3% | 2 | 33 | 1.1 | 12.2 | Δ | ○ | Aggregation breaking |
| Example 2 | PM-21: 0.5% | 3 | 34 | 1.3 | 11.8 | Δ | ○ | Aggregation breaking |
| | PM-21: 1.0% | 22 | 33 | 1.2 | 12.5 | Δ | Δ | Aggregation breaking |
| | PM-21: 5.0% | 89 | 33 | 1.2 | 12.7 | x | x | Aggregation breaking |
| | PM-21: 10% | 162 | 34 | 1.1 | 13.5 | x | x | Aggregation breaking |

TABLE 1-continued

| Items | Material for primer (wt %) | Thickness (nm) | Light transmittance when electric field applied (%) | Light transmittance when no electric field applied (%) | Bonding Strength (N/m) | Tackiness | Transferability | Peeling Mode |
|---|---|---|---|---|---|---|---|---|
| Example 3 | PM-2M: 0.3% | 3 | 34 | 1.1 | 11.8 | Δ | ○ | Aggregation breaking |
| Example 4 | PM-2M: 0.5% | 3 | 33 | 1.2 | 12.5 | Δ | ○ | Aggregation breaking |
|  | PM-2M: 1.0% | 27 | 35 | 1.2 | 11.8 | Δ | Δ | Aggregation breaking |
|  | PM-2M: 5.0% | 92 | 33 | 1.1 | 12.5 | x | x | Aggregation breaking |
|  | PM-2M: 10% | 171 | 34 | 1.3 | 12.5 | x | x | Aggregation breaking |

TABLE 1

| Items | Material for primer (wt %) | Thickness (nm) | Light transmittance when electric field applied (%) | Light transmittance when no electric field applied (%) | Bonding Strength (N/m) | Tackiness | Transferability | Peeling Mode |
|---|---|---|---|---|---|---|---|---|
| Example 5 | PHOSMER PP: 1.0% | 25 | 33 | 1.3 | 11.5 | Δ | ○ | Aggregation breaking |
| Example 6 | PHOSMER PP: 5.0% | 84 | 34 | 1.1 | 12.4 | x | x | Aggregation breaking |
| Example 7 | PHOSMER PE: 1.0% | 24 | 34 | 1.2 | 11.8 | Δ | Δ | Aggregation breaking |
| Example 8 | PHOSMER PE: 5.0% | 87 | 34 | 1.1 | 12.3 | x | x | Aggregation breaking |
| Example 9 | PHOSMER M: 1.0% | 23 | 32 | 1.3 | 11.6 | Δ | Δ | Aggregation breaking |
| Example 10 | PHOSMER-M: 5.0% | 101 | 33 | 1.3 | 11.7 | x | x | Aggregation breaking |
| Enample 11 | RDX63182: 1.0% | 31 | 34 | 1.2 | 11.3 | Δ | Δ | Aggregation breaking |
| Example 12 | RDX63182: 5.0% | 107 | 32 | 1.1 | 12.3 | x | x | Aggregation breaking |
| Example 13 | KBM-603: 3.0% | 68 | 33 | 1.2 | 10.5 | x | x | Aggregation breaking but patially-interfaicial peeling |
| Example 14 | KBM-603: 5.0% | 102 | 32 | 1.3 | 9.8 | x | x | Aggregation breaking but patially-interfaicial peeling |
| Example 15 | KBM-603: 10% | 188 | 34 | 1.2 | 8.3 | x | x | Aggregation breaking but patially-interfaicial peeling |

TABLE 3

| Items | Material for primer (wt %) | Thickness (nm) | Light transmittance when electric field applied (%) | Light transmittance when no electric field applied (%) | Bonding Strength (N/m) | Tackiness | Transferability | Peeling Mode |
|---|---|---|---|---|---|---|---|---|
| Comparative Example 1 | No primer | — | 32 | 1.1 | 1.8 | — | — | Interfacial peeling |
| Comparative Example 2 | KBM-403: 1.0% | 33 | 34 | 1.2 | 2.1 | Δ | Δ | Interfacial peeling |
| Comparative Example 3 | KBM-503: 1.0% | 30 | 33 | 1.2 | 2.5 | Δ | Δ | Interfacial peeling |
|  | KBM-503: 5.0% | 98 | 32 | 1.2 | 2.3 | x | x | Interfacial peeling |
|  | KBM-503: 10% | 185 | 33 | 1.2 | 3.1 | x | x | Interfacial peeling |
| Comparative Example 4 | KBM-803: 1.0% | 34 | 34 | 1.1 | 1.3 | Δ | Δ | Interfacial peeling |
|  | KBM-803: 5.0% | 99 | 32 | 1.3 | 1.5 | x | x | Interfacial peeling |
|  | KBM-803: 10% | 190 | 32 | 1.3 | 2.3 | x | x | Interfacial peeling |
| Comparative Example 5 | BL-1: 10% | 203 | 30 | 1.4 | 0 | ○ | ○ | Interfacial peeling |
| Comparative Example 6 | BL-1H: 10% | 211 | 31 | 1.3 | 0 | ○ | ○ | Interfacial peeling |
| Comparative Example 7 | BL-S: 10% | 228 | 30 | 1.3 | 0 | ○ | ○ | Interfacial peeling |
| Comparative Example 8 | KS-10: 10% | 208 | 32 | 1.4 | 0 | ○ | ○ | Interfacial peeling |
| Comparative Example 9 | Polyimide: 5.0% | 121 | 33 | 1.2 | 0.7 | ○ | ○ | Interfacial peeling |
| Comparative Example 10 | EB3702: 5.0% | 106 | 32 | 1.2 | 0.8 | Δ | Δ | Interfacial peeling |

As shown in Tables 1 to 3, about the light transmittance when electric field was applied and that when no electric field was applied, a difference was hardly generated between Comparative Example 1 and Examples. In Comparative Example 1, wherein no primer layer was used, together with Comparative Examples 2 to 10, in each of which primer layers other than the primer layers in the invention were formed, the bonding strength was remarkably small, and peeling was caused at the interface between the substrates and the light control layer. On the other hand, in any one of Examples, a specific phosphoric ester or specific silane coupling agent was used, thereby improving the bonding strength largely, and peeling was also generated in an aggregation breaking mode. Thus, the adhesiveness was able to be largely improved while the light control property was kept.

Example 16

Primer layers were each formed in accordance with the following steps: A Mayer bar coating method was used to apply, onto the whole of a surface with a line size of 0.10 mm, a solution wherein a mixture of a UV curable hard coating material, SANRAD RC-610R (manufactured by Sanyo Chemical Industries, Ltd.), as a polymerizable monomer, and P-1M (manufactured by Kyoeisha Chemical Co., Ltd.) as a phosphoric monoester was dissolved in a mixed solvent of methyl ethyl ketone and cyclohexane (1:1). The material SANRAD RC-610R contains 1-hydroxy-cyclohexyl phenyl ketone as a polymerization initiator.

Next, the resultant was dried at 50° C. for 30 seconds, at 60° C. for 30 seconds and at 70° C. for 1 minute, and then cured by use of a metal halide lamp (illuminance: about 250 mW/cm$^2$, and exposure dose: about 1000 mJ/cm$^2$), so as to form the primer layer. At this time, the amount of the material SANRAD RC-610R was set to 3% by mass, and that of the material P-1M was set to 0.3% by mass. Thereafter, in the same way as in Example 1, a light control film was produced and various properties thereof were measured. The thickness of each of the formed primer layers was 65 nm.

Example 17

Primer layers were each formed in the same way as in Example 16 except that the blend proportion of the material SANRAD RC-610R as an active energy ray polymerizable monomer was changed to 1% by mass, that of the material P-1M as a phosphoric monoester was changed to 0.1% by mass, and a microgravure method (mesh: #150) was used. Thereafter, in the same way as in Example 1, a light control film was produced and various properties thereof were measured. The thickness of each of the formed primer layers was 10 nm.

Example 18

Primer layers were each formed in the same way as in Example 16 except that the blend proportion of the material SANRAD RC-610R as an active energy ray polymerizable monomer was changed to 0.5% by mass, and that of the material P-1M as a phosphoric monoester was changed to 0.05% by mass. Thereafter, in the same way as in Example 1, a light control film was produced and various properties thereof were measured. The thickness of each of the formed primer layers was 3 nm.

Example 19

A light control film was produced and various properties thereof were measured in the same way as in Example 1 except that the solution when the primer layers were formed was changed to a 0.3% by mass solution of P-1M (Kyoeisha Chemical Co., Ltd.) used as a phosphoric acid modified ester. The thickness of each of the formed primer layers was 2 nm.

Example 20

A light control film was produced and various properties thereof were measured in the same way as in Example 1 except that the solution when the primer layers were formed was changed to a 0.1% by mass solution of P-1M (Kyoeisha Chemical Co., Ltd.) used as a phosphoric acid modified ester. The thickness of each of the formed primer layers was 1 nm.

Example 21

A light control film was produced and various properties thereof were measured in the same way as in Example 1 except that the solution when the primer layers were formed was changed to a 0.05% by mass solution of P-1M (Kyoeisha Chemical Co., Ltd.) used as a phosphoric acid modified ester. The thickness of each of the formed primer layers was 0.7 nm.

Comparative Example 11

A light control film was produced and various properties thereof were measured in the same way as in Example 1 except that the solution when the primer layers were formed was changed to a 3% by mass solution of SANRAD RC-610R (manufactured by Sanyo Chemical Industries, Ltd.) used as a polymerizable monomer. The thickness of each of the formed primer layers was 60 nm.

Comparative Example 12

A light control film was produced and various properties thereof were measured in the same way as in Example 1 except that the solution when the primer layers were formed was changed to a 1% by mass solution of SANRAD RC-610R (manufactured by Sanyo Chemical Industries, Ltd.) used as a polymerizable monomer. The thickness of each of the formed primer layers was 12 nm.

Comparative Example 13

A light control film was produced and various properties thereof were measured in the same way as in Example 1 except that the solution when the primer layers were formed was changed to a 0.5% by mass solution of SANRAD RC-610R (manufactured by Sanyo Chemical Industries, Ltd.) used as a polymerizable monomer. The thickness of each of the formed primer layers was 4 nm.

TABLE 4

| Items | Material for primer (wt %) | Thickness (nm) | Light transmittance when electric field applied (%) | Light transmittance when no electric field applied (%) | Bonding Strength (N/m) | Tackiness | Transferability | Peeling Mode |
|---|---|---|---|---|---|---|---|---|
| Example 16 | SANRAD: 3% P-1M: 0.3% | 65 | 32 | 1.3 | 11.5 | ○ | ○ | Aggregation breaking |
| Example 17 | SANRAD: 1% P-1M: 0.1% | 10 | 32 | 1.3 | 10.8 | ○ | ○ | Aggregation breaking |
| Example 18 | SANRAD: 0.5% P-1M: 0.05% | 3 | 31 | 1.3 | 10.5 | ○ | ○ | Aggregation breaking |
| Example 19 | P-1M: 0.3% | 2 | 33 | 1.1 | 12 | Δ | ○ | Aggregation breaking |
| Example 20 | P-1M: 0.1% | 1 | 31 | 1.5 | 10.4 | Δ | ○ | Aggregation breaking |
| Example 21 | P-1M: 0.05% | 0.7 | 30 | 1.4 | 11.1 | Δ | ○ | Aggregation breaking |
| Comparative Example 11 | SANRAD: 3% | 60 | 30 | 1.3 | 1.9 | ○ | ○ | Interfacial peeling |

TABLE 4-continued

| Items | Material for primer (wt %) | Thickness (nm) | Light transmittance when electric field applied (%) | Light transmittance when no electric field applied (%) | Bonding Strength (N/m) | Tackiness | Transferability | Peeling Mode |
|---|---|---|---|---|---|---|---|---|
| Comparative Example 12 | SANRAD: 1% | 12 | 33 | 1 | 1.5 | ○ | ○ | Interfacial peeling |
| Comparative Example 13 | SANRAD: 0.5% | 4 | 31 | 1.2 | 1.8 | ○ | ○ | Interfacial peeling |

Industrial Applicability

In the light control film of the present invention, the adhesiveness between its light control layer and its transparent electroconductive resin substrates is high so that a stable light control function can be expressed.

The invention claimed is:

1. A light control film comprising:
   two transparent electroconductive resin substrates; and
   a light control layer sandwiched between the two transparent electroconductive resin substrates, the light control layer containing:
   a resin matrix; and
   a light control suspension dispersed in the resin matrix,
   wherein the light control film has a primer layer on the light control layer side of at least one of the transparent electroconductive resin substrates, and the primer layer is formed by using a phosphoric ester having in the molecule thereof one or more polymerizable groups.

2. The light control film according to claim 1, wherein the primer layer is formed by using a phosphoric monoester or a phosphoric diester having in the molecule thereof one or more polymerizable groups.

3. The light control film according to claim 1, wherein the polymerizable group is a (meth)acryloyloxy group.

4. The light control film according to claim 1, wherein the primer layer is formed by using a solution containing the phosphoric ester having in the molecule thereof one or more polymerizable groups, and
   the concentration of the phosphoric ester having in the molecule thereof one or more polymerizable groups in the solution is within the range from 0.05 to 20% by mass.

5. The light control film according to claim 1, wherein the primer layer is formed, further by using a polymerizable monomer or oligomer in combination.

6. The light control film according to claim 5, wherein the polymerizable monomer or oligomer is an acrylate.

7. The light control film according to claim 5, wherein the polymerizable monomer or oligomer is cured by heat or light.

8. The light control film according to claim 1, wherein a film thickness of the primer layer is 1 μm or less.

9. A light control film comprising:
   two transparent electroconductive resin substrates; and
   a light control layer sandwiched between the two transparent electroconductive resin substrates, the light control layer containing;
   a resin matrix; and
   a light control suspension dispersed in the resin matrix,
   wherein the light control film has a primer layer on the light control layer side of at least one of the transparent electroconductive resin substrates, and the primer layer is formed by using a silane coupling agent having an amino group.

10. The light control film according to claim 9, wherein the primer layer is formed by using a solution containing the silane coupling agent having an amino group, and
    the concentration of silane coupling agent having an amino group in the solution is from 1 to 15% by mass.

11. The light control film according to claim 9, wherein a film thickness of the primer layer is 1 μm or less.

* * * * *